Figure 1:
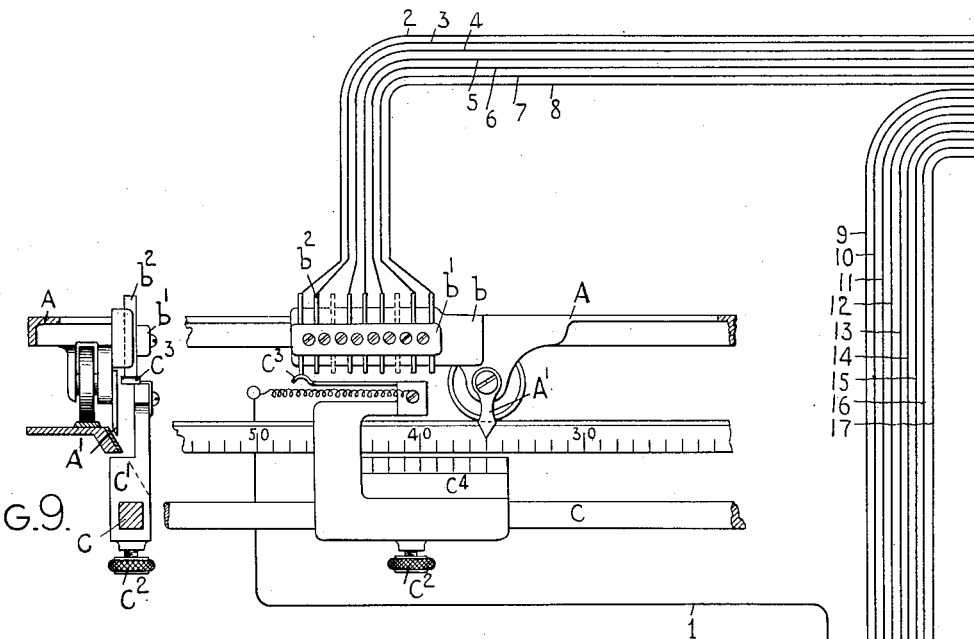
Figure 1:
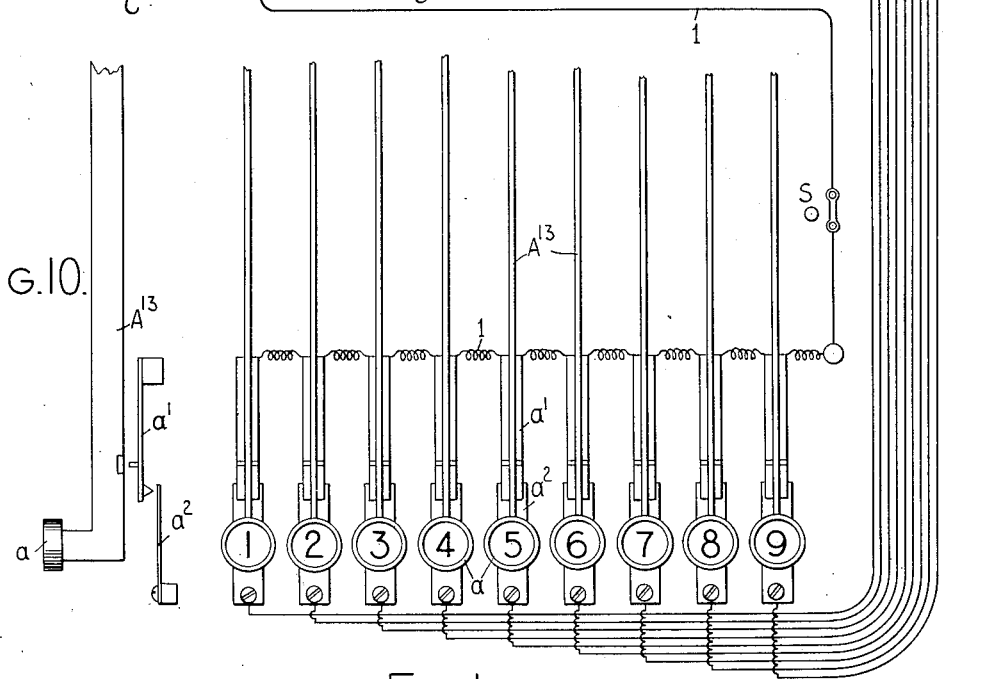

A. H. ELLIS.
COMBINED TYPE WRITING AND ADDING MACHINE.
APPLICATION FILED JUNE 12, 1911.

998,759.

Patented July 25, 1911.
5 SHEETS—SHEET 1.

WITNESSES:

INVENTOR:
Albert H. Ellis
By Jacob Felbel
HIS ATTORNEY

A. H. ELLIS.
COMBINED TYPE WRITING AND ADDING MACHINE.
APPLICATION FILED JUNE 12, 1911.

998,759.

Patented July 25, 1911.
5 SHEETS—SHEET 2.

WITNESSES:

INVENTOR:
Albert H. Ellis
By Jacob Felbel
HIS ATTORNEY

A. H. ELLIS.
COMBINED TYPE WRITING AND ADDING MACHINE.
APPLICATION FILED JUNE 12, 1911.

998,759.

Patented July 25, 1911.
5 SHEETS—SHEET 4.

WITNESSES:

INVENTOR:
Albert H. Ellis
HIS ATTORNEY

A. H. ELLIS.
COMBINED TYPE WRITING AND ADDING MACHINE.
APPLICATION FILED JUNE 12, 1911.
998,759.
Patented July 25, 1911.
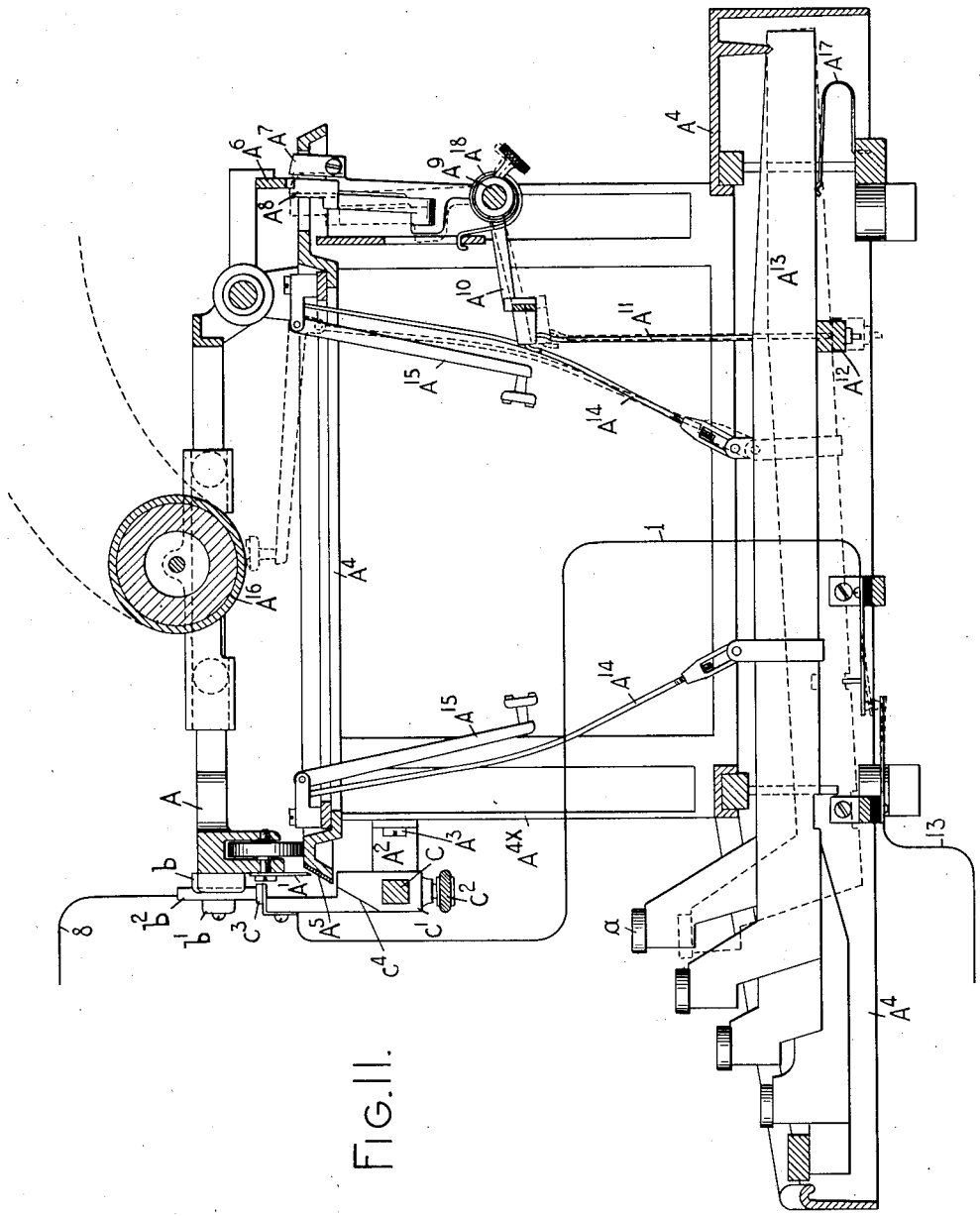
FIG. II.
WITNESSES:
INVENTOR:
Albert H. Ellis
HIS ATTORNEY

UNITED STATES PATENT OFFICE.

ALBERT H. ELLIS, OF BRIELLE, NEW JERSEY, ASSIGNOR TO WYCKOFF, SEAMANS & BENEDICT, OF ILION, NEW YORK, A CORPORATION OF NEW YORK.

COMBINED TYPE-WRITING AND ADDING MACHINE.

998,759.  Specification of Letters Patent.  Patented July 25, 1911.

Original application filed November 1, 1899, Serial No. 735,449. Divided and this application filed June 12, 1911. Serial No. 632,632.

*To all whom it may concern:*

Be it known that I, ALBERT H. ELLIS, citizen of the United States, and resident of Brielle, in the county of Monmouth and State of New Jersey, have invented certain new and useful Improvements in Combined Type-Writing and Adding Machines, of which the following is a specification.

My invention relates to combined typewriting and adding machines, and it has for its principal object to provide adding mechanism arranged to be operated in conjunction with typewriting mechanism in such a manner as to add automatically numbers written by said typewriting mechanism, and including connections adjustable to locate the adding column or field at different positions widthwise of the paper.

The present case is a division of my prior application filed November 1st, 1899, Serial No. 735,449. In said prior application the connections from the typewriter to the adding machine, are shown in two forms, and said prior application contains claims specific to one of said forms as well as claims broad enough to cover both forms. The present application is limited to the one of said forms of connection not specifically claimed in the parent case.

My invention consists in certain features of construction and combinations and arrangements of parts, all of which will be fully set forth herein and particularly pointed out in the claims.

In seeking to attain the specific objects of my invention, I have provided electric connections between the writing mechanism and the adding mechanism, but some of the features of the invention will also be found useful in cases where the writing mechanism is mechanically connected to the adding mechanism. Moreover, in pursuing said object I have devised contrivances and combinations, mechanical as well as electrical, which will be found useful in machines whose construction varies from mine in other respects.

Typewriting machines are usually provided with a series of keys, each of which is connected to one or more types in such a manner that the depression of any key causes its appropriate type to strike against the paper. These types are sometimes mounted on type bars and sometimes on a wheel or in other ways. As far as my invention is concerned, it is immaterial in what manner the types are connected to the keys. Typewriting machines also usually have some part which moves step-by-step as the several keys are actuated in order to cause the types to strike the paper one after another a suitable distance apart. In some typewriting machines a paper carriage has this step-by-step movement and in others, as in most book typewriters, the paper is stationary and the type action travels over the paper. Whatever part of the machine it is that has this step-by-step motion, I shall call the carriage. In the present instance I have shown my invention applied to a Remington typewriter in which the types are mounted on pivoted type bars and in which the paper carriage is movable step-by-step.

The adding attachment may be, and preferably is, entirely disconnected mechanically from the writing machine, but since it operates electrically, it is connected with the machine by electric conductors, which may be flexible or rigid as desirable. The only apparatus necessary for direct attachment to the typewriter, is such as is required for completing the electric circuits, and this is extremely simple.

In making out bills, waybills, manifests, statements, or records of any character containing columns of figures to be added, when a numeral is printed in either the units, tens, hundreds or other column, the said numeral will be automatically added as units, tens, hundreds, etc., according to the column in which the numeral is printed, so that the total will show upon the face of the adding machine and may be copied therefrom at the foot of the column.

In carrying out my invention I prefer to use the ordinary figure keys of the typewriter keyboard, and to provide for printing with these keys on all portions of a line, or page, except the column or columns to be added, without affecting the adding mechanism; but as soon as the paper is struck by the figure types in a figure column, the adding mechanism operates. For this purpose two sets of circuit controllers on the typewriter are used; that is to say, each circuit connecting the typewriter with the adding mechanism contains two circuit controllers in series with each other. One set of circuit controllers is controlled by the keys, while the other set is made operative or inoperative by the position of the paper-carriage or other part of the typewriter making step-by-step movements. The operation of any one of the circuit controllers will not affect the adding machine, but both operated simultaneously will cause it to perform its functions.

The invention will be described in detail with reference to the accompanying drawings, in which—

Figure 2:
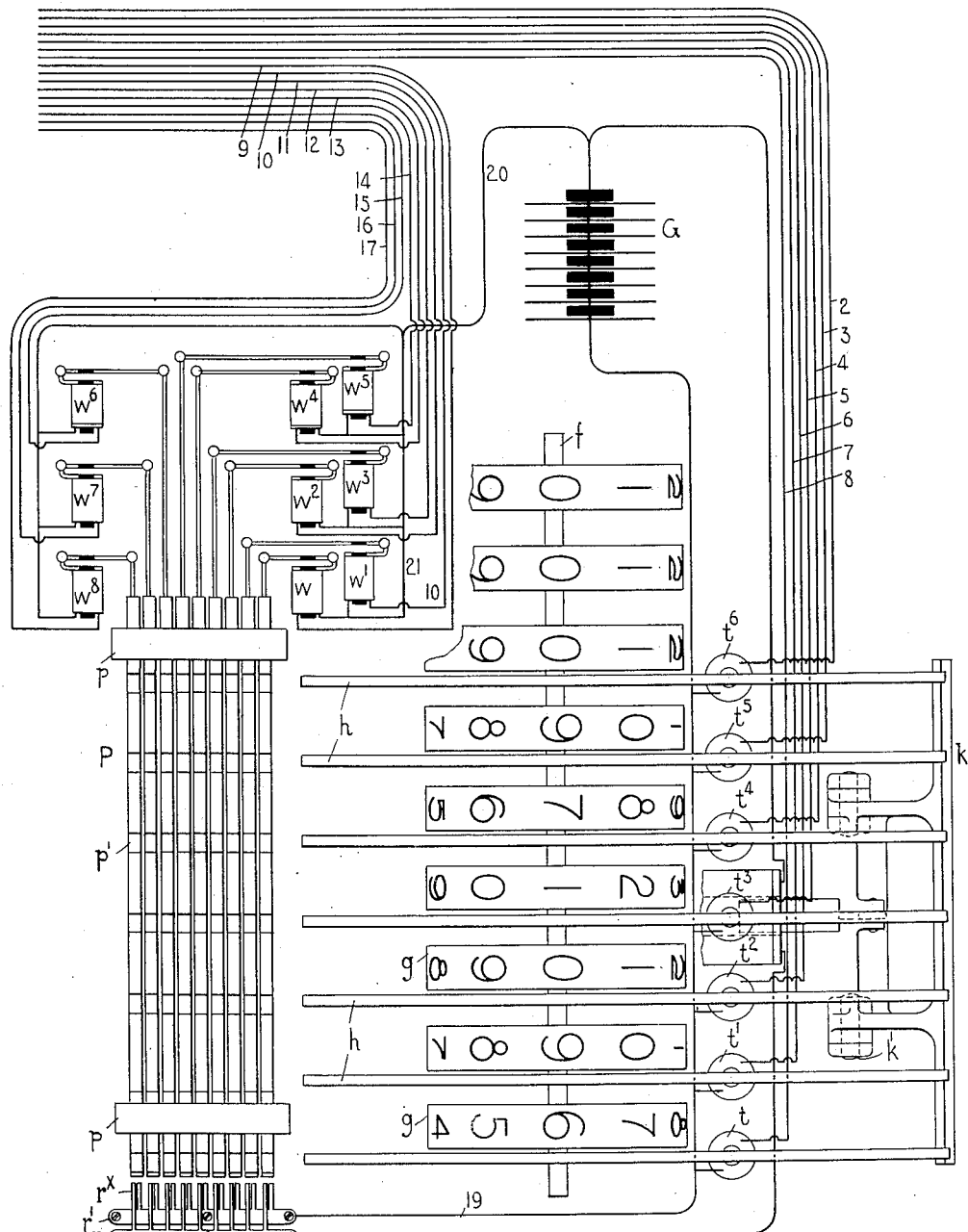
Figure 3:
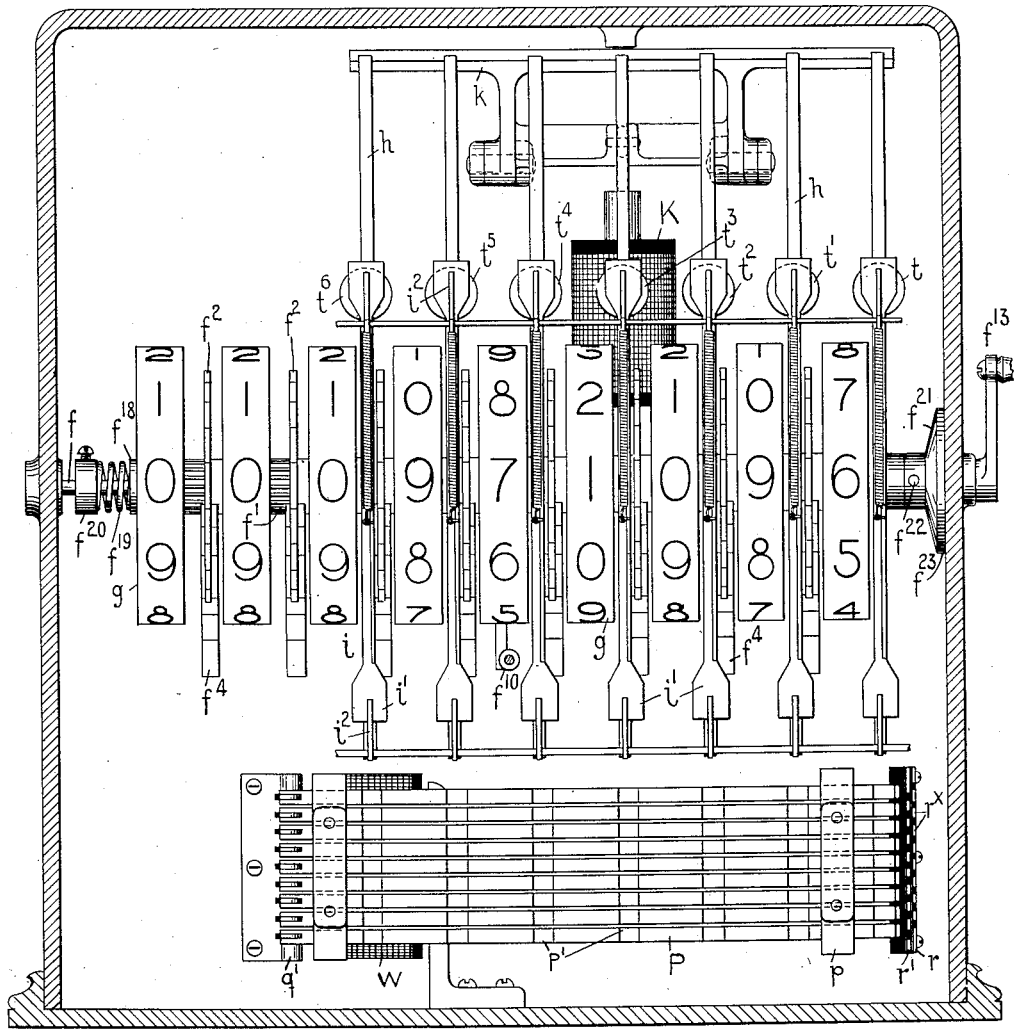
Figure 8:
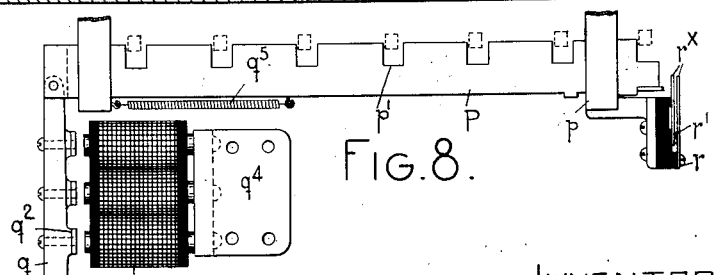
Figure 4:
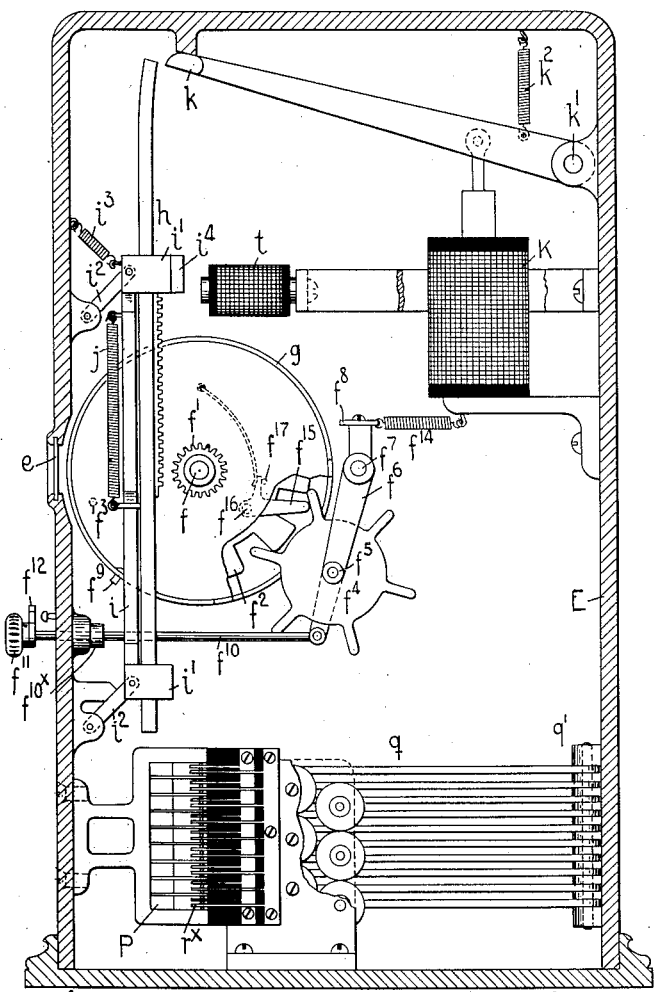
Figure 5:
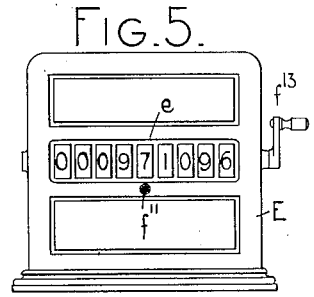
Figure 6:
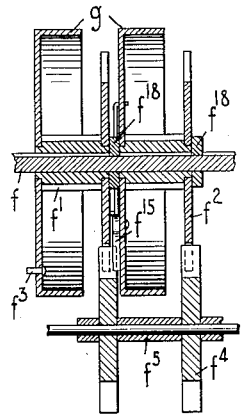
Figure 7:
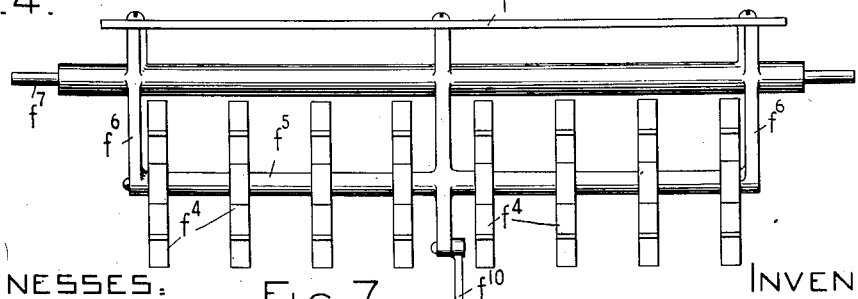

Figure 1 is a conventional representation of the apparatus and circuits forming a part of or directly connected with a typewriting machine, in accordance with my invention. Fig. 2 is a similar representation of the adding mechanism, and is to be read in connection with Fig. 1. Fig. 3 is a front elevation of the adding machine, the casing being in section. Fig. 4 is an end elevation of the same with parts broken away. Fig. 5 is a front elevation of the adding machine on a reduced scale. Fig. 6 is a section through a portion of the main shaft of the adding machine and its countershaft. Fig. 7 is a front elevation of the countershaft of the adding machine and its connections. Fig. 8 is a plan of the stop bars. Fig. 9 is an end elevation of the fragment of carriage mechanism and the column gage shown at Fig. 1. Fig. 10 is a side view of a typewriter key, showing a circuit controller connected thereto. Fig. 11 is a longitudinal vertical section of a typewriting machine provided with electrical devices in accordance with my invention.

Referring first to Figs. 1, 9, 10 and 11, illustrating the apparatus connected directly with the typewriter, the figure keys $a$, from "1" to "9" inclusive, each operates a circuit controller consisting of contact plates $a^1$ and $a^2$. The plates $a^1$ are electrically connected in series with one another in the circuit 1. The contact plates $a^2$ are the respective terminals of nine wires numbered from 9 to 17 inclusive, and extending to the adding wheel mechanism through a flexible cable or otherwise. Fixed to the paper carriage frame A of the typewriter are a block $b$ and a clamping plate $b^1$, holding between them a series of metallic pins $b^2$, which stand vertically and with their lower ends exposed and on a level. These pins are the terminals of a series of wires 2 to 8 inclusive, also extending to the adding wheel mechanism through a flexible cable or otherwise. $c$ indicates a guiding rail or track which is secured to the typewriter frame, as by arms $A^2$, secured by screws $A^3$ to front corner-posts $A^{4x}$ of the framework $A^4$ of the typewriter, adjacent to the scale $A^5$, in front of which index $A^1$ moves. Upon this rail $c$ is a slide $c^1$ provided with a set screw $c^2$ by which its position on the rail may be fixed, and carrying a contact finger $c^3$ adapted to make contact with the lower ends of the pins $b^2$ when in the traverse of the paper-carriage they are carried over the finger; the slide also is provided with a short section of scale $c^4$ having the same divisions as the scale in front of which the index plays, and having as many divisions as there are pins $b^2$. The slide $c^1$ may be set at any position in front of the scale of the machine, and its position, obviously, will determine at what location in the line of writing the circuits of the series 2 to 8 will be closed by the finger $c^3$. The device $c^1$ with its appurtenances may therefore be termed an "adding-column gage". The finger $c^3$ is the terminal of wire 1, which, as before stated, leads to each of the contact plates $a^1$ beneath the keys. As usual, the carriage is provided with a letter-spacing rack, $A^6$, with which engage escapement dogs $A^7$ and $A^8$ which rock upon an axis $A^9$, and are provided with a forwardly extending operating arm $A^{10}$, from which is suspended, by rods $A^{11}$, a universal bar $A^{12}$, arranged beneath and transversely of key levers $A^{13}$. To each key lever is connected, by a rod $A^{14}$, a type bar $A^{15}$, the type bars being radially arranged about a common printing center, and a platen $A^{16}$ being mounted upon the carriage over the common printing center. Such type-bars as are connected to the keys $a$ bear figure types, and the other type bars bear letter and character types. Each key lever is provided with a lifting spring $A^{17}$. A returning spring $A^{18}$ is provided for the escapement dogs and universal bar.

Referring now to the adding mechanism, it is again pointed out that these devices may be either secured directly upon the typewriting machine or placed on a table or shelf or other support adjacent thereto, since preferably they are connected to the writing machine only through electrical conductors 2 to 17, which may be arranged in a single cable. The adding mechanism is contained in the casing E, the face of which is provided with an opening $e$ through which the totals may be seen. Immediately behind this opening $e$ is a shaft $f$, upon which are mounted adding disks or wheels $g$, bearing upon their peripheries the figures from zero to 9. The hub of each disk $g$ carries a pinion $f^1$ and a notched wheel $f^2$, the latter being used to turn the adding disk when the next disk $g$ to the right has completed a rotation. For this purpose each disk $g$ is provided with a tens-carrying pin $f^3$, to engage with a tens-carrying star wheel $f^4$ on a counter-shaft $f^5$, there being one star wheel for each disk. The pin $f^3$ strikes an arm of the star wheel $f^4$ and forces it against one of the projections of the notched wheel $f^2$, causing the corresponding disk to move one point forward, thereby adding ten units, tens or hundreds, etc., as the case may be.

In place of the pin $f^3$ a pawl $f^{15}$, pivoted at $f^{16}$ to the disk, and lightly spring-pressed against a stop $f^{17}$ thereon, may be used, so that in case a star wheel should be rotated by a notched wheel at a time when the parts are in the position indicated at Fig. 4, the succeeding tooth of the star wheel will lift the pawl and slip by it, without imparting movement to the disk upon which the pawl is pivoted. The fixed pin $f^3$ answers for the second and third wheels from the left-hand end at Fig. 3, since the star wheels associated therewith are never driven by the two left-hand notched wheels, as the latter are unprovided with independent actuating mechanism.

The counter-shaft $f^5$ is suspended from arms $f^6$, pivoted upon an axis $f^7$, said arms projecting beyond the axis and carrying a stop plate $f^8$, normally standing adjacent to the peripheries of the row of disks. Each disk is also provided with a peripheral pin or tappet $f^9$. The counter-shaft $f^5$ is adapted to be swung backward by a rod $f^{10}$, to carry the star wheels out of the range of movement of the pins $f^3$. The rod $f^{10}$ passes through the front of the case and is there fitted with a knob $f^{11}$ and a catch $f^{12}$, by which an operator may at will throw the star wheels into and out of operative position. When the star wheels are thrust backward, the plate $f^8$ swings forward into the path of movement of tappets $f^9$; and while the parts are in this position the crank $f^{13}$ on the disk shaft may be rotated, and all of the disks turned together, until the tappets $f^9$ are all stopped against the plate $f^8$, in which position all of the disks show zero through the opening $e$. By releasing knob $f^{11}$ the stop plate $f^8$ is removed, and the star wheels swing forward again under the action of spring $f^{14}$ until collar $f^{10\times}$ on rod $f^{10}$ abuts against a fixed part of the casing, when the device is in position to again count from zero upward. The disks are spaced along the shaft $f$ by means of friction washers $f^{18}$, which are splined to the shaft. A compression spring $f^{19}$, bearing at one end against a collar $f^{20}$ secured to the shaft, and at the other end against one of said washers, produces sufficient friction between the washers and the disks to insure the latter being rotated by the shaft at the operation of crank $f^{13}$. An enlarged friction disk or brake $f^{21}$ is also splined to the shaft by means of a pin $f^{22}$, and bears against the inner side wall of the casing at $f^{23}$, to prevent accidental rotation of the shaft.

Corresponding to the series of adding wheels is a series of vertically arranged rack bars or drivers $h$ adapted to engage with the pinions $f^1$ of the respective adding wheels, but normally disengaged therefrom. Each rack bar is carried by bearings $i^1$ attached to another bar $i$, the latter being hung upon parallel links $i^2$, $i^2$, pivoted to the face plate of the casing. A spring $i^3$ swings the bars $h$ and $i$ upward and forward, and so out of engagement with the pinions. Another spring $j$ connects bars $h$ and $i$ together, and holds the former in an elevated position. The upper bearing $i^1$ of each bar $i$ is provided with an iron armature $i^4$, and behind the armature stand electromagnets $t$, $t^1$, $t^2$, etc. When any one of these magnets is energized, the armature and consequently the parts $i^2$ and $h$ are swung downward and backward so that the rack engages the pinion on the hub of the corresponding adding wheel. The rack bars $h$ all extend upward to a point near the top of the casing, adjacent to which is a push bar or actuator $k$, common to all the rack bars and pivoted to the casing at $k^1$. This actuator is adapted to be swung downward by a solenoid magnet K, and afterward returned to normal position by a spring $k^2$. So long as the rack bars occupy their normal or disengaged position, the actuator cannot affect them, but when any one of them is thrown into engagement with its corresponding pinion, its upper end assumes a position directly under the actuator, and if the latter then operates against it, the rack bar is thrust downward until it is stopped, during which movement it rotates its corresponding adding disk. Upon the circuit which controls the magnet $t$ being broken, the spring $i^3$ swings the driver $h$ out of engagement with the pinion, whereupon the spring $j$ elevates the rack to initial position. The extent of rotation of a given disk determines the quantity added, so that by arranging to stop the downward movement of the rack bar at various points, the quantity added at each operation can be controlled. I have provided such a stopping arrangement in the lower part of the casing of the adding machine. It consists of a series of stop bars P arranged one above the other in a suitable frame $p$, wherein each bar is free to slide independently in a longitudinal direction. Across the front face of the gang of stop bars, a series of vertical grooves $p^1$ is cut immediately beneath the ends of the drivers $h$. So long as these grooves or cutaways are unobstructed, the driver has free movement across the face of the entire series of stop-bars, but when any one of them is longitudinally displaced the grooves are closed by such displacement, and the drivers can only travel across the face of the stop bars until they are intercepted by the displaced stop bar. It will now be understood that by selecting a certain disk for rotation and a certain stop bar for determining the extent of its rotation, any amount may be calculated by the machine. With each stop bar is connected a lever $q$ pivoted at $q^1$, and to this lever is attached an armature $q^2$, in front of which is arranged an electro-magnet; the nine magnets are mounted upon a suitable bracket $q^4$, and are lettered $w$, $w^1$, $w^2$, etc. When any one of these magnets is energized, the corresponding lever $q$ and stop bar P are moved, the stop bars being returned to their normal positions by springs $q^5$. Adjacent to the opposite ends of the stop bars are two metallic plates $r$ and $r^1$ suitably insulated from each other, and each having a projection $r^x$ standing in the path of movement of the stop bars. When any stop bar is moved by its magnet, it contacts with one projection $r^x$ on each of the two plates $r$ and $r^1$, and closes a circuit which is traced by wires 18 and 19 leading through the solenoid K and the battery G.

In operation, the slide or column gage $c^1$ is adjusted along the rail $c$ until the third division mark on its scale (counting from the left) is opposite the point on the machine scale where the decimal point separating the dollars and cents column occurs; after operating the letter keys to write the first item on the page, the carriage is moved to the left by the operation of the usual release key or spacing key until the carriage index $A^1$ points to that division on the gage scale $c^4$ which corresponds to the position of the first figure of the amount to be written. By reason of this adjustment of the column gage, the "hundreds" adding wheel (the fifth from the left at Figs. 2 and 3), is automatically coupled to all the figure keys at that point in the line of writing at which numerals in the "hundreds" column occur. Thus, if 256.74 is the amount, the index $A^1$ will be stopped at the sixth division of the slide scale from the left, at which point the contact finger $c^3$ will be against the fifth full line pin $b^2$, counting from the right, thereby coupling the magnet $t^4$ to all the figure keys, and simultaneously enabling any chosen key to energize the corresponding stop-operating magnet. Then the figure keys for "2," "5" and "6" are struck in succession, then the period key, and then the figure keys for "7" and "4." When key for the numeral "2" is depressed, the lever $A^{13}$ swings downwardly, and by means of the connecting rod $A^{14}$ swings the rear type-bar having the type "2" thereon up against the paper on the platen, so that the numeral "2" is imprinted upon the paper. At the same time the universal bar $A^{12}$ is carried down by the key lever, and the initial movement of the spacing dogs is effected in a well-known manner through the rods $A^{11}$ and the rocker $A^{10}$, all as indicated by dotted lines at Fig. 11. The key lever also carries down the contact plate $a^1$, so that it touches the contact plate $a^2$, as also indicated by dotted lines, whereby a circuit is closed from the key through wire 1, finger $c^3$, wire 4, magnet $t^4$, wire 19, battery G, wires 20 and 21, magnet $w^1$, wire 10, and back to key "2." The circuits of all the other magnets $w$ and $t$ are open at the keyboard and carriage. The energizing of magnet $t^4$ throws the fifth rack bar or driver $h$ into engagement with its pinion, and the energizing of magnet $w^1$ displaces the second stop bar. The stop bar in moving closes the circuit of the solenoid K through wires 18 and 19, and the actuator $k$ is accordingly pulled downward, forcing the rack bar down until it is arrested by the displaced stop bar. The engagement of the rack and pinion rotates the fifth disk two points forward, showing the figure "2" at the hundreds position, through the opening in front of the machine. The moment the key is released, the key lever, type bar, universal bar and feeding dogs, as well as the contact plate $a^1$, resume their normal positions and the carriage moves a letter space, so that the circuit traced above is broken at two places by the rising of the key and the feeding of the paper carriage, whereupon the several magnets become deënergized and the springs $j$, $q^5$ and $k^2$ return the parts to normal position. At the same time the movement of the paper carriage makes contact between the next pin and the finger $c^3$, thereby coupling the succeeding adding wheel to all the figure keys. Next, the numeral "5" key is struck, the type "5" is imprinted on the paper, and a circuit is closed through wire 1, finger $c^3$, wire 5, magnet $t^3$, wire 19, battery G, wire 20, magnet $w^4$, wire 13, and back to key "5." This effects an operative connection between the fourth rack bar and its adding wheel, and displaces the fifth stop bar, whereupon the circuit of solenoid K is closed and the fourth disk rotated until its figure "5" shows in the opening in front of the casing. In the same manner each of the figures in the amount of quantity is written. In writing the second and succeeding numbers in the column, it is obvious that since the disks are constructed upon the usual plan of adding machines, they will show a total through the opening in the casing corresponding to the total amount written by the machine at any given time. When the column has been finished, the total amount shown by the adding machine may be written underneath the column, the hand switch or controller $s$ having been first shifted; or if the total is written in the next column to the right, as is often the case, the switch $s$ need not be operated since the position of the gage $c^1$ leaves the circuit in normal condition and prevents the further operation of the adding mechanism.

In Fig. 1 two of the pins $b^2$ are shown in dotted lines. On writing amounts of money, or other amounts which it is desired to point off with commas or periods, such characters may be written in at the places where the omitted pins occur, without affecting any of the circuits; thus, while the amount 256.74 occupies six spaces, only five of them are figure spaces, and only five disks of the adding mechanism would be rotated in writing it, the other space being occupied by the period, and the pin for that space being omitted or shifted.

It will be understood that while I have described the circuit controller as mounted partly upon the paper carriage, the term is intended to comprehend any carriage or connected part which is moved by the spacing devices, or in the event of the invention being used as an adding machine merely, any suitable step-by-step moving device.

The adding-wheels may be operated whenever the carriage is in position for writing the figures in the desired column, independently of any other or further movements of the carriage, so that in the operation of writing and adding a column of figures it is only necessary that the carriage shall move back and forth a distance equal to the width of the column; while at any time, if desired, the carriage may move a longer distance to enable the printing of words or other figures in connection with the adding column.

The provision of the scale along which the column gage may slide is of great importance, as it enables said gage to be instantly and accurately set to position for enabling the carriage to properly connect the adding wheels to the figure keys, so that when the figures are printed on the paper they are also added on the corresponding adding wheels, without liability of error or of failure of the adding wheels to act. The column gage can be set to any portion of the line of writing. At all other portions of the line, whether preceding or following the column gage, words may be written, or, if desired, columns of figures may be written without affecting the adding mechanism. The means for connecting the adding wheels to the figure keys are positively controlled by the carriage, so that the wheels can be so engaged only one at a time, and only in their proper order.

In carrying out my improvements it is not essential to follow the precise details of construction herein set forth, as many changes may be made within the scope of the invention.

What I claim as new and desire to secure by Letters Patent, is:—

1. The combination with typewriting mechanism including a series of letter types, a series of figure types, a series of keys therefor and a carriage connected to the keys for letter space movements, of a series of adding wheels provided with suitable connections to said figure keys, a rail arranged upon the stationary frame of the machine parallel with the travel of said carriage, an adding-column gage adjustably mounted upon said rail and provided with means for controlling said connections from the adding wheels to the figure keys, and a fixed scale arranged upon the machine in proximity to the column gage.

2. The combination of typewriting mechanism including a carriage, adding mechanism connected with said typewriting mechanism by electric circuits having terminals arranged a letter space apart on said carriage, and a contact finger adjustable along the traverse of the carriage and adapted to make connection with the circuit terminals in succession.

3. The combination with typewriting mechanism including a series of letter types, a series of figure types, a series of keys therefor and a carriage connected to the keys for letter space movements, of a series of adding wheels provided with suitable connections to said figure keys, an adjustable adding-column gage for controlling said connections from the wheels to the keys, and a scale arranged upon said column gage, the divisions in said scale being fixed at letter space intervals and corresponding to the arrangement of the adding wheels.

4. The combination with typewriting mechanism including a series of letter types, a series of figure types, a series of keys therefor and a carriage connected to the keys for letter space movements, of a series of adding wheels provided with suitable connections to said figure keys, a rail arranged upon the frame of the machine parallel with the travel of said carriage, an adding-column gage adjustably mounted upon said rail and provided with means for controlling said connections from the adding wheels to the figure keys, a scale arranged upon said column gage, the divisions in said scale being fixed at letter space intervals and corresponding to the arrangement of the adding wheels, and a scale fixed upon the machine in proximity to said column gage.

5. The combination with typewriting mechanism including a series of letter types and figure types, keys therefor and a carriage connected to the keys for letter space movements, of a series of adding wheels, mechanisms for rotating them, a group of contact points arranged upon said carriage, each contact point being the terminal of a circuit from said carriage to an adding wheel rotating mechanism, a gage arranged to slide along the frame of the machine parallel with the path of the carriage, a contact closer arranged upon said gage, and means controlled by said finger keys for completing said circuits.

6. The combination of a typewriting machine, including a carriage, an adding mechanism connected therewith by electric circuits, and a circuit controller one portion of which is carried by the moving carriage, while the other portion is adjustable along the traverse of the said carriage for the purpose of determining at what location in the line of writing the adding mechanism shall be operative.

7. The combination of a typewriting machine including a carriage, an adding mechanism connected therewith by electric circuits having stationary terminals arranged a letter space apart on the moving carriage of the writing machine, and a contact finger adjustable along the traverse of the carriage and adapted to make connection with the circuit terminals in succession whereby the position on the line of writing at which the adding mechanism will be operative may be predetermined.

8. In a writing and adding machine, in combination, a traveling carriage, printing mechanism, a set of adding wheels, a single set of figure keys and connections therefrom adapted to operate said wheels, means for effecting a relative adjustment between the carriage travel and said set of adding wheels, whereby the said set of wheels becomes operative at different selective portions of the carriage travel and thus enable an adding column to be produced at different predetermined portions widthwise of the sheet being written upon, said means bearing a scale having its divisions fixed at letter space intervals, and a pointer coöperating with said scale to indicate which adding wheel is in operative connection with the keys.

9. In a writing and adding machine, in combination, a set of number wheels, one for each denomination, a single set of figure printing keys common to all denominations, a carriage for spacing the printing, a set of denominational devices, one for each wheel, mounted to move with said carriage, and a single coöperating device mounted on the stationary frame of the machine, said coöperating device being adjustable parallel with the carriage travel to locate an adding column at different positions widthwise of the paper.

Signed at Manasquan in the county of Monmouth and State of New Jersey this 6th day of June A. D. 1911.

ALBERT H. ELLIS.

Witnesses:
JOHN HULSART,
VOORHEES S. COOK.